H. KELLOGG.
Quartz Mill.
No. 52,363.
Patented Jan'y 30, 1866.
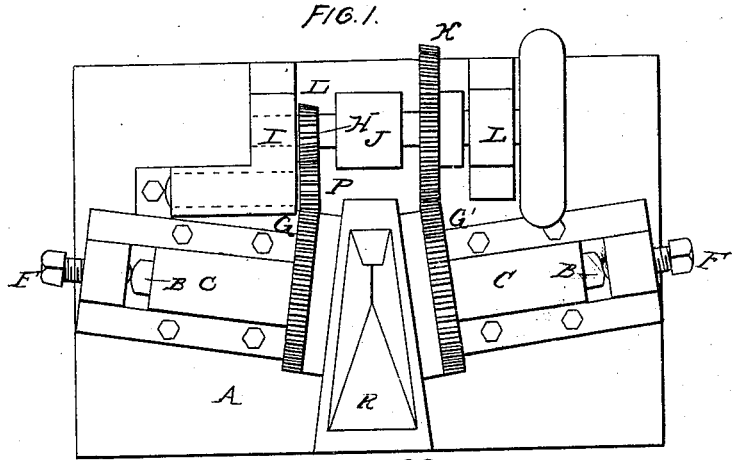
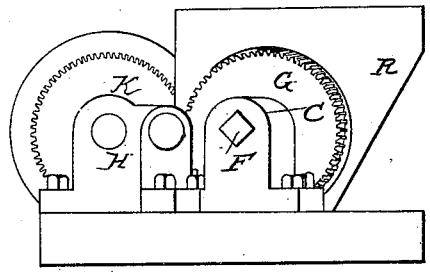
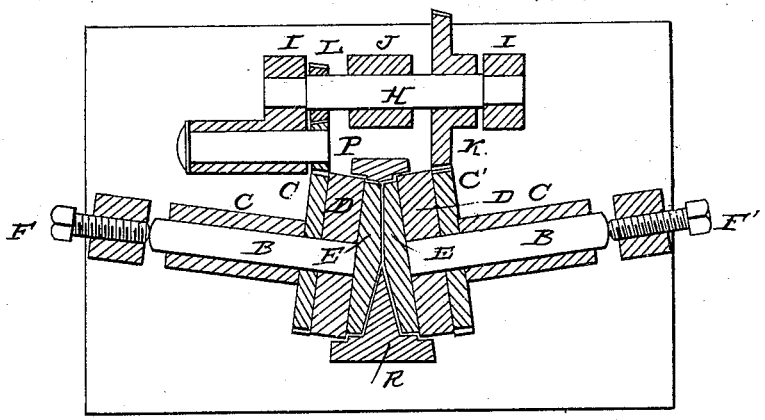
WITNESSES
John E. Earle
John H. Shumway
INVENTOR
Henry Kellogg

UNITED STATES PATENT OFFICE.

HENRY KELLOGG, OF NEW HAVEN, CONNECTICUT, ASSIGNOR TO H. B. BIGELOW AND DANL. P. CALHOUN, OF SAME PLACE.

IMPROVEMENT IN QUARTZ-MILLS.

Specification forming part of Letters Patent No. 52,363, dated January 30, 1866.

*To all whom it may concern:*

Be it known that I, HENRY KELLOGG, of New Haven, in the county of New Haven and State of Connecticut, have invented a new and useful Improvement in Quartz-Crushers; and I do hereby declare the following, when taken in connection with the accompanying drawings and the letters of reference marked thereon, to be a full, clear, and exact description of the same, and which said drawings constitute part of this specification, and represent, in—

Figure 1, a top or plan view; Fig. 2, an end view, and in Fig. 3 a central section taken on line $x\,x$, Fig. 2.

My invention relates to an improvement in machines for breaking, crushing, or pulverizing minerals, designed more particularly for crushing and pulverizing quartz.

To enable others skilled in the art to construct and use my improvement, I will fully describe my invention as illustrated in the accompanying drawings.

A is the bed-plate; B and B', shafts supported and revolving in bearings $c$, fixed upon the bed-plate diagonally to each other, as seen in Figs. 1 and 3.

Fixed upon each of the two shafts B and B' are two heads, D and D', to each of which is fixed in any convenient manner a disk, E and E'. The said disks are made slightly conical, so that the surfaces of the two will be parallel to each other upon the inner angle formed by the two shafts, and the two shafts are adjusted by means of screws F and F' to place the disks in close contact or a little distance apart, as may be required.

G and G' are gear-wheels fixed, respectively, to the shafts B and B'.

H is the driving-shaft, made to revolve in bearings I by power applied to the pulley J, from which power is communicated to the disks E and E', the disk E', by the gear-wheel K, working directly into the gear-wheel G', the other disk, E, in the opposite direction by means of the gear-wheel L and the intermediate gear, P, and the said wheels of such proportion that the disk E shall revolve in the opposite direction to the disk E' about three times while the disk E' revolves five times, this proportion to be varied as may be required. The most rapid grinding, requiring the greatest power, would be when the two disks would revolve alike and in the same direction, and decreasing both the power required and the rapidity of grinding until the two disks should be made to revolve with equal velocity in opposite directions. The proportions I have stated I find to be the most economical for general uses.

R is a hopper placed over the two disks and opening over the parallel sides of the disks, as seen in Fig. 1.

When it is desired simply to crack the quartz or like material preparatory to pulverizing, the disk E should be adjusted so that in revolving the parallel sides would be about one-half to three-fourths of an inch apart. In this position, and the power applied to revolve the disks, lumps of the quartz or the material to be broken placed in the hopper will pass down to the disks and be there broken and crushed until reduced in size so as to pass down between the two disks.

If desired to pulverize the quartz or like material, adjust the disks so that the two surfaces will come in close contact to each other. Then introduce the broken quartz into the hopper, as before described, whence they will pass down between the disks and be pulverized.

My machine, if properly constructed, may be adjusted so as to serve a good and valuable purpose for breaking coal, stone, &c.

Having therefore fully described my invention, what I claim as new and useful, and desire to secure by Letters Patent, is—

The two conical disks E and E', constructed substantially in the manner described, having their respective shafts placed diagonally to each other, in the manner herein fully set forth.

HENRY KELLOGG.

Witnesses:
JOHN E. EARLE,
JOHN H. SHUMWAY.